United States Patent
Mondello et al.

(10) Patent No.: US 12,135,679 B2
(45) Date of Patent: Nov. 5, 2024

(54) SYSTEM ON CHIP INCLUDING A RECONFIGURABLE CONNECTION INTERFACE BETWEEN MASTER DEVICES AND SLAVE DEVICES

(71) Applicant: STMicroelectronics S.r.l., Agrate Brianza (IT)

(72) Inventors: Antonino Mondello, Messina (IT); Salvatore Pisasale, San Gregorio di Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 45 days.

(21) Appl. No.: 17/835,746

(22) Filed: Jun. 8, 2022

(65) Prior Publication Data
US 2022/0405232 A1  Dec. 22, 2022

(30) Foreign Application Priority Data
Jun. 21, 2021  (FR) ........................................ 2106544

(51) Int. Cl.
*G06F 15/78* (2006.01)
*G06F 15/173* (2006.01)

(52) U.S. Cl.
CPC .... *G06F 15/7871* (2013.01); *G06F 15/17312* (2013.01); *G06F 15/7807* (2013.01)

(58) Field of Classification Search
CPC ........... G06F 15/17312; G06F 15/7807; G06F 15/7871
See application file for complete search history.

(56) References Cited

U.S. PATENT DOCUMENTS

| | | | |
|---|---|---|---|
| 2007/0266196 A1* | 11/2007 | Torii | G06F 13/1631 710/309 |
| 2008/0294806 A1 | 11/2008 | Swindle et al. | |
| 2013/0024621 A1* | 1/2013 | Choi | G06F 15/7871 711/149 |
| 2016/0179728 A1* | 6/2016 | Kaul | G06F 13/4022 710/317 |
| 2018/0129531 A1* | 5/2018 | Diewald | G06F 1/3243 |
| 2020/0174964 A1 | 6/2020 | Ardichvili et al. | |
| 2022/0156210 A1* | 5/2022 | Lin | G06F 15/7807 |

* cited by examiner

*Primary Examiner* — Jacob Petranek
(74) *Attorney, Agent, or Firm* — Slater Matsil, LLP

(57) ABSTRACT

In an embodiment a system on chip includes at least one master device, at least one slave device, a connection interface configured to route signals between the at least one master device and the at least one slave device, the connection interface configured to operate according to configuration parameters, and a configuration bus connected to the connection interface, wherein the configuration bus is configured to deliver new configuration parameters to the connection interface so as to adapt operation of the connection interface.

20 Claims, 3 Drawing Sheets

[Fig 1]
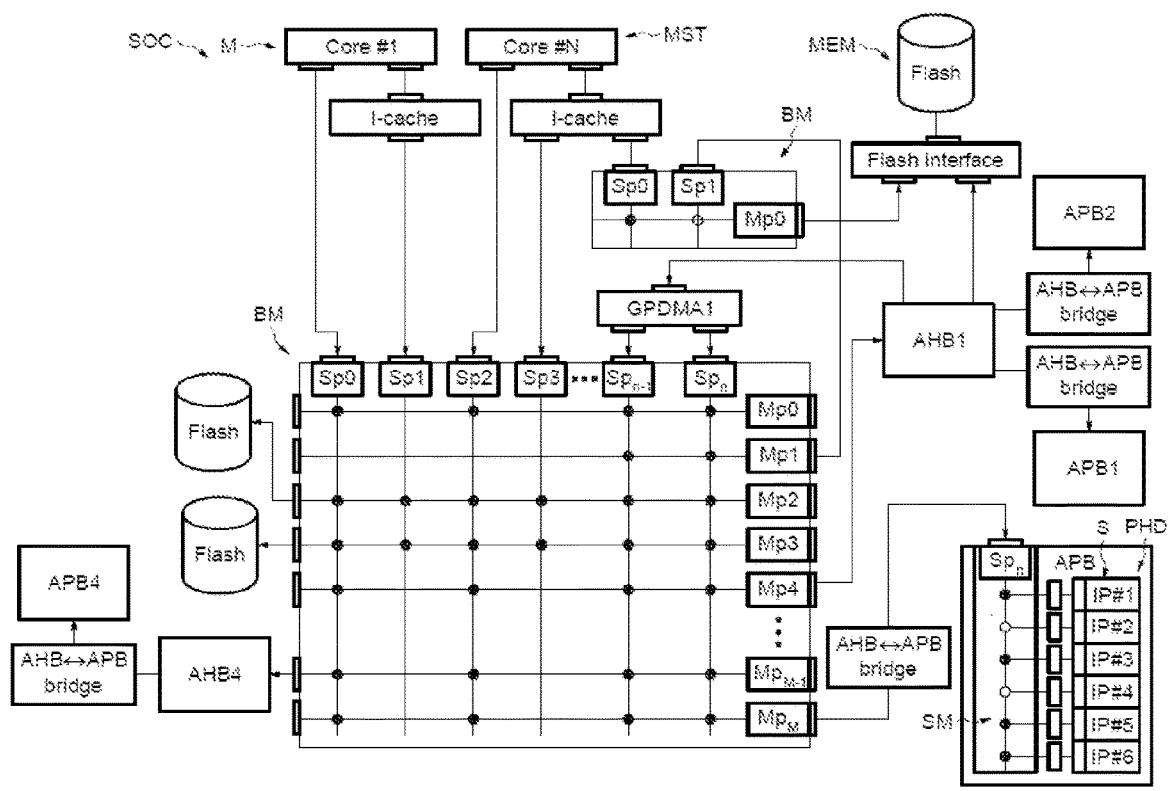

[Fig 2]
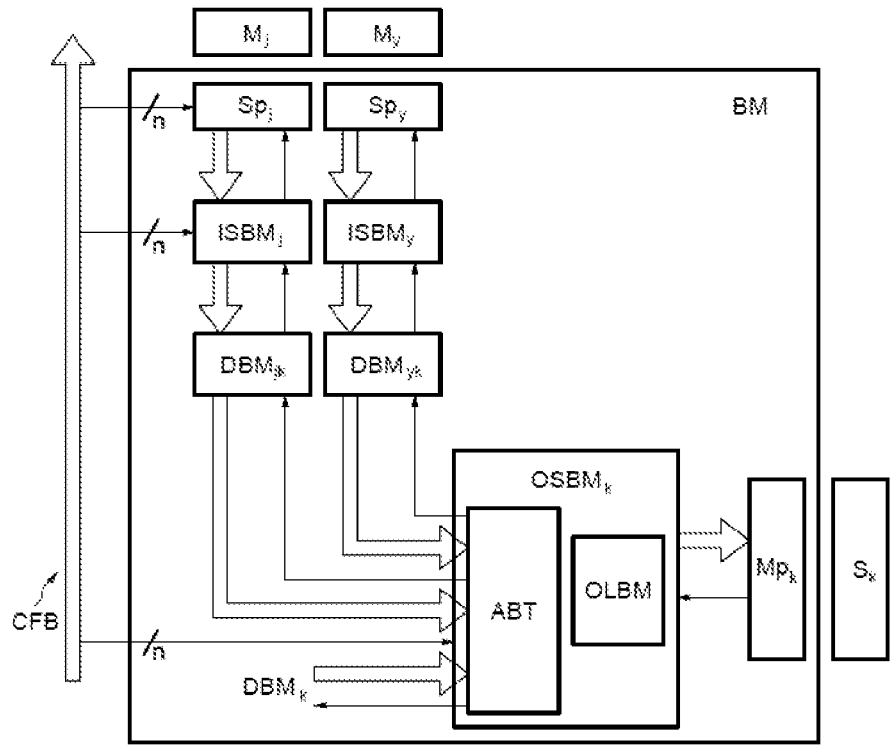
[Fig 3]
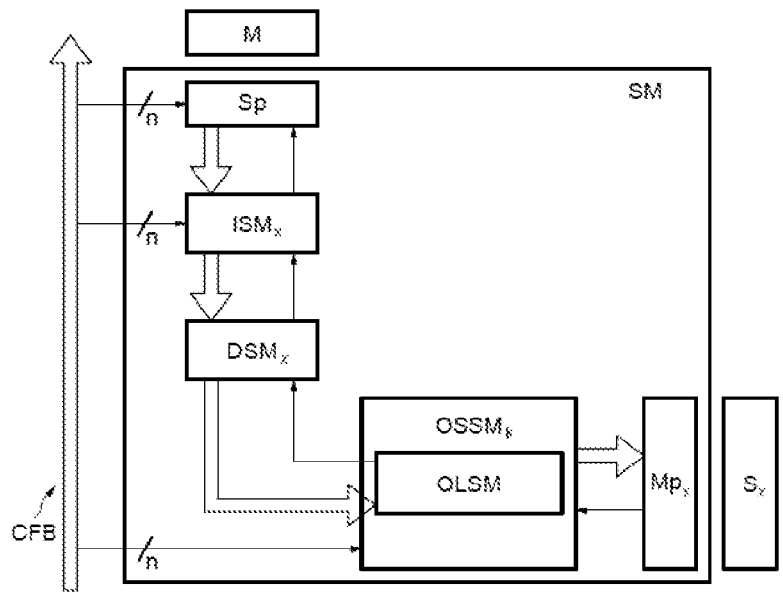

[Fig 4]
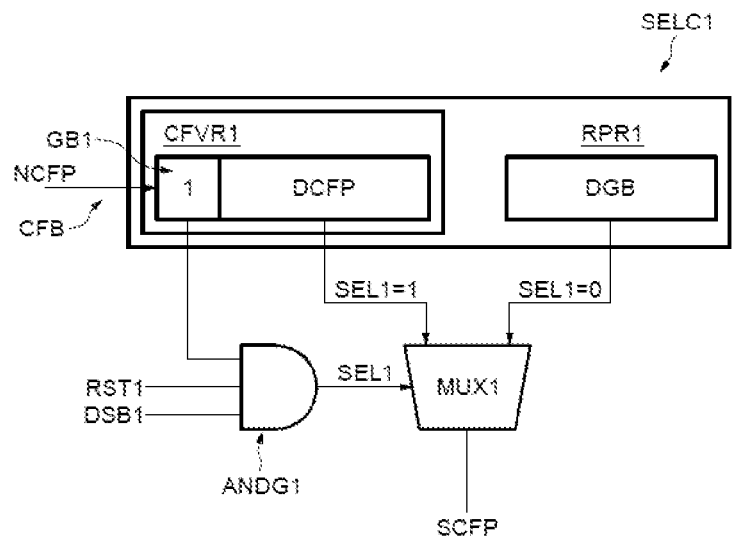
[Fig 5]
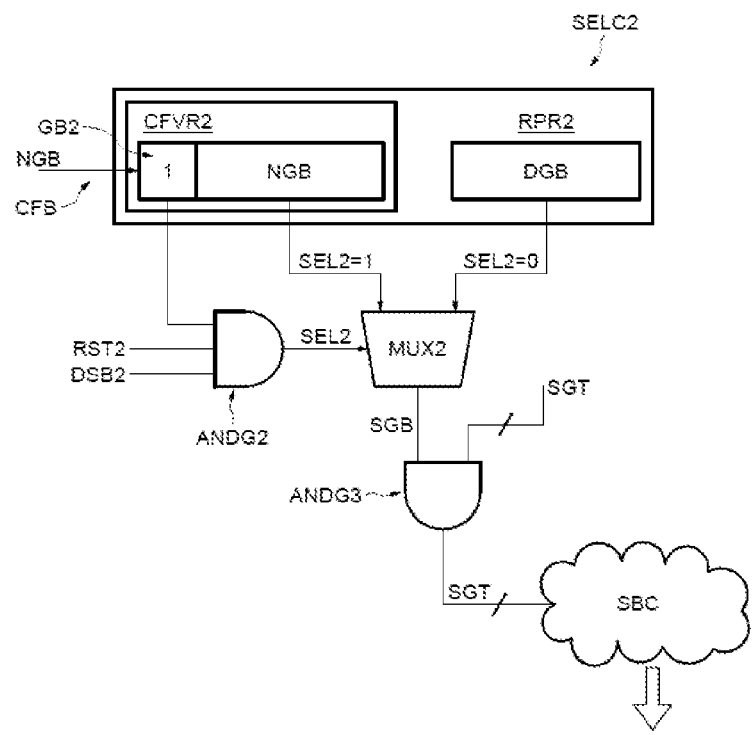

SYSTEM ON CHIP INCLUDING A RECONFIGURABLE CONNECTION INTERFACE BETWEEN MASTER DEVICES AND SLAVE DEVICES

CROSS-REFERENCE TO RELATED APPLICATIONS

This application claims the benefit of French Application No. 2106544, filed on Jun. 21, 2021, which application is hereby incorporated herein by reference.

TECHNICAL FIELD

Embodiments of the present disclosure refers to a system on a chip (also known by the acronym "SoC"), and more particularly, to a connection interface between master devices and slave devices of the system on chip.

BACKGROUND

A system on chip is an integrated electronic system configured to perform a plurality of functions. The system on chip can be used in an electronic device such as a microcontroller and can include a plurality of components. For example, the components can comprise at least one processing core, one or more volatile and non-volatile memories, for example a flash memory, and a plurality of peripherals. Some of the components are used as master devices, such as the processing core. Other components are used as slave devices, such as the peripherals.

The components of the system on chip are interconnected via at least one connection interface (also called interconnection interface). For example, a connection interface can be a principal bus matrix or a connection interface inside a peripheral domain to address the different peripherals of the peripheral domain.

Such connection interfaces are statically configured, for example in hard coded mode, so that, after a first initial configuration phase, the configuration of the bus matrix can no longer be changed.

Therefore, by using such connection interfaces, the versatility of the system on chip is limited. In particular, the communication between the components of the system on chip cannot be adapted to specific applications.

The problem therefore arises of providing a system on chip presenting improved versatility.

SUMMARY

Embodiment provide a system on chip comprising at least one master device, at least one slave device, a connection interface configured to route signals between said at least one master device and said at least one slave device, the connection interface being configured to operate according to configuration parameters, and a configuration bus connected to the connection interface, the configuration bus being configured to deliver new configuration parameters to the connection interface so as to adapt the operation of the connection interface.

In such a system on chip, the operation of the connection interface can be modified with new configuration parameters.

Therefore, the system on chip presents an improved versality of use, thanks to the possibility of modifying the operation of the connection interface.

For example, such system on chip allows a route table and a remap table of the connection interface to be modified. The system on chip can also allow an arbiter policy of the connection interface to be modified so as to adapt the priorities between the master devices. The system on chip can also allow enabling or disabling the master devices and the slave devices.

Advantageously, the connection interface comprises at least one input stage connected to said at least one master device, at least one output stage connected to said at least one slave device, and at least one decoder connected to said at least one input stage and to said at least one output stage.

In particular, said at least one input stage, said at least one output stage and said at least one decoder are configured to operate according to said configuration parameters. More particularly, the configuration bus is connected to said at least one input stage, to said at least one output stage and to said at least one decoder and is configured to deliver to them the new configuration parameters so as to define their operation.

Preferably, said at least one output stage includes an arbiter and an output logic circuit.

According to a particularly advantageous embodiment, the system on chip comprises a memory connected to the configuration bus, the new configuration parameters being stored in said memory.

According to a particularly advantageous embodiment, the system on chip comprises default configuration parameters coded at a register-transfer level.

Preferably, the connection interface comprises a selection circuit configured to select the configuration parameters to apply amongst the new configuration parameters and the default configuration parameters.

Advantageously, the selection circuit is configured to select the new configuration parameters to apply according to a value of a guard bit guarantying that the new configuration parameter is valid.

Thus, the guard bit can be used to guarantee that a new configuration parameter is not corrupted.

According to a particularly advantageous embodiment, the memory in which the new configuration parameters are stored is a flash memory.

Alternatively, the new configuration parameters are stored is a one-time programmable memory.

Alternatively, the new configuration parameters are stored in a plurality of system configuration registers. Such system configuration registers are in a persistent domain, i.e. they are powered with a battery in order to not lose information during standby.

BRIEF DESCRIPTION OF THE DRAWINGS

Other advantages and features of the invention will appear in the detailed description of embodiments and implementations, in no way restrictive, and the attached drawings in which:

FIG. 1 shows a system on chip comprising a plurality of master devices M and a plurality of slave devices;

FIG. 2 illustrates an example of two connections of a bus matrix according to an embodiment;

FIG. 3 illustrates a connection of a submatrix according to an embodiment; and

FIGS. 4 and 5 illustrate different selection circuits according to embodiments.

DETAILED DESCRIPTION OF ILLUSTRATIVE EMBODIMENTS

FIG. 1 shows a system on chip SOC comprising a plurality of master devices M and a plurality of slave devices S. The system on chip can also comprise at least one memory MEM, for example a flash memory, with a flash interface to communicate with the memory. The system on chip can also comprise instruction caches I-cache.

The system on chip can also include a general-purpose direct memory access $GPDMA_1$, different buses such as advanced high-performance buses $AHB_1$, $AHB_4$ and advanced peripheral buses APB, $APB_1$, $APB_2$, $APB_4$.

For example, the system on chip can comprise different processing units as master devices M. The system on chip can comprise peripherals IP #1, . . . , IP #6 as slave devices S. The peripherals can be organized in different domains PHD and sub-domains.

The system on chip SOC also comprises different connection interfaces between the master devices and the slave devices. In particular, the system on chip comprises at least one bus matrix BM as a connection interface. The bus matrix BM is a connection interface that is connected on one side to the masters M and on the other side directly to the slave devices S or to a peripheral domain PHD.

The bus matrix BM is configured to route the signals between the master devices M and either the slave devices S or the peripheral domains PHD so as to allow a communication between the master devices M and either the slave devices S or the peripheral domain PHD.

The bus matrix BM is arranged in rows and columns. Each row is connected to one master port $Mp_O$, . . . , $Mp_N$ of the bus matrix BM. Each column is connected to one slave port $Sp_O$, . . . , $Sp_N$ of the bus matrix BM. In FIG. 1, the connections between the rows and the columns are represented with dots.

According to the connections defined by the bus matrix, each slave S can communicate with different masters M, and each master M can communicate with different slaves S. The bus matrix BM is hard coded.

A connection interface, named submatrix SM, is also included in each peripheral domain PDM or sub-domain. Such a submatrix SM comprises on a first side a port connected to the bus matrix BM and on the other side a port connected to the peripherals or to the subdomains.

FIG. 2 illustrates an example of two connections of a bus matrix. In particular, the bus matrix is configured to connect a master device Mj to a slave device Sk, and to connect a master device My to the slave device Sk. Thus, the bus matrix comprises two slave ports Spj and Spy connected respectively to the master devices Mj et My, and a master port Mpk connected to the slave device Sk.

The bus matrix also comprises an input stage ISBMj, ISBMy for each master device Mj, My connected to the bus matrix BM. Each input stage ISBMj, ISBMy is configured to register and hold an incoming transfer from the master device Mj, My connected to this input stage ISBMj, ISBMy. In particular, each input stage ISBMj, ISBMy is configured to hold the incoming transfer when the slave device Sk is busy.

The bus matrix also comprises a decoder DBMjk, DBMyk, for each connection between a slave port Spj, Spy and a master port Mpk (i.e. for each dot of the matrix). Each decoder is configured to select a slave device. In particular, the decoder implements a route table for each master device. The decoder is able to implement a remap mechanism and is further configured to route messages from the slave device connected to the decoder to the master.

The bus matrix BM comprises an output stage for each slave device S connected to the bus matrix. For example, in FIG. 2, the bus matrix comprises an output stage OSBMk connected to the master port My and the slave device Sk.

The output stage OSBMk is connected to the decoders DBMjk and DBMyk and to all the other decoders DBMk of the row connected to the master port My.

Each output stage includes an arbiter ABT, configured to determine which slave port has access to the shared slave device, and output logic OLBM. The output logic OLBM is configured to decide when to communicate with the master device selected by the arbiter.

FIG. 3 illustrates a connection of a submatrix SM. The submatrix is configured to connect one master device to different slave devices. For example, the connection of the submatrix SM shown in FIG. 3 connects a master M to a slave device Sx. Thus, for each connection, the submatrix comprises one slave port Sp connected to the master device M, and a master port Mpx connected to the slave device Sx.

The submatrix SM comprises an input stage ISSM connected to a master port of the bus matrix. The input stage ISSM is configured to register and hold an incoming transfer from the bus matrix. In particular, the input stage ISSM is configured to hold the incoming transfer when the slave device S is busy.

The submatrix SM also comprises a decoder DSMx, for each connection between an input stage ISSM and an output stage OSSMx of the submatrix SM. The decoder DSMx is configured to select a slave device and to implement a map table.

Each output stage OSSMx includes an output logic OLSM. The output logic OLSM is configured to decide when to communicate with the master device.

The bus matrix BM and each submatrix SM are configured to operate according to configuration parameters. For example, the configuration parameters are used to define the operation of each input stage ISBM, ISSM. In particular, the configuration parameters can be used to disable a master device.

The configuration parameters are also used to define the operation of each decoder DBM, DSM. In particular, the configuration parameters can define the route map and the remap table of the bus matrix BM or of the submatrix SM.

The configuration parameters are also used to define the operation of each output stage OSBM, OSSM. In particular, the configuration parameters can be used to disable a slave device and to define the arbiter policy.

The system on chip is configured to modify the configuration parameters so as to adapt the operation of the bus matrix and of each submatrix. This allows the versality of the system on chip improved.

More particularly, the system on chip SOC comprises default configuration parameters coded at a register-transfer level (i.e. RTL coded). The default configuration parameters define a default operation of the bus matrix and of each submatrix. The default operation of the bus matrix and of each submatrix is chosen when designing the system on chip. In particular, the default configuration parameters are chosen to guarantee the functionality of the bus matrix and of each submatrix in all possible scenarios. Nevertheless, the configuration parameters can be modified during runtime to improve the performance and the flexibility of the bus matrix and of each submatrix.

Indeed, as shown in FIGS. 1 and 2, the bus matrix BM and each submatrix SM are connected to a configuration bus. More particularly, each input stage ISBM, ISSM, each decoder DBM, DSM and each output stage OSBM, OSSM of the bus matrix BM and of each submatrix SM is connected to a configuration bus CFB.

The configuration bus CFB is configured to deliver new configuration parameters to the bus matrix BM and to each submatrix SM. The new configuration parameters allow the operation of the bus matrix BM and of each submatrix SM to be modified and are stored in a memory MEM, such as a flash memory or a one-time programmable memory or a plurality of system configuration registers in a persistent domain.

In particular, the flash memory is configured to include a flash memory area devoted to storage of the new configuration parameters. This flash memory area can be protected so that only an authorized user can access them and modify their values.

Alternatively, the one-time programmable memory includes a memory area devoted to storage of the new configuration parameters for the connection interfaces. This memory area can also be protected Alternatively, some configuration system registers in a persistent domain are devoted to storage of the new configuration parameters for the connection interfaces.

The bus matrix BM and each submatrix SM comprise selection circuits. FIGS. 4 and 5 illustrate different selection circuits $SELC_1$, $SELC_2$.

The selection circuits are configured to select the configuration parameters between the default configuration parameters DCFP and the new configuration parameters NCFP. In particular, each element of the bus matrix and of each submatrix comprises such a selection circuit.

More particularly, each input stage ISBM, ISSM comprises a selection circuit $SELC_1$ and/or $SELC_2$ configured to select the configuration parameters of this input stage.

Each decoder DBM, DSM also comprises a selection circuit configured to select the configuration parameters of this decoder.

Each output stage also comprises a selection circuit configured to select the configuration parameters of this output stage.

As shown in FIG. 4, each selection circuit $SELC_1$ comprises relevant parameter registers.

The relevant parameter registers $RPR_1$ are configured to store default configuration parameters DCFP coded at register-transfer level. These default parameters DCFP are associated to the element of the connection interface (i.e. the input stage, the decoder or the output stage) that includes the selection circuit $SELC_1$.

The relevant parameter registers $RPR_1$ also comprise a volatile register $CFVR_1$ connected to the configuration bus CFB and configured to store new configuration parameters NCFP received from the configuration bus CFG.

In particular, the system on chip can be configured to read the new configuration parameters NCFP stored in the memory MEM after a reset of the system on chip. Then, the system on chip can be configured to deliver the new configuration parameters to the volatile register $CFVR_1$ through the configuration bus CFG.

The volatile register $CFVR_1$ can also be configured to store a guard bit $GB_1$. The guard bit $GB_1$ is configured to validate the possibility of using the new configuration parameters. The value of the guard bit $GB_1$ is defined according to a value of an error-correcting code of the memory MEM after the reading of the new configuration parameters NCFP. In particular, if the error-correcting code indicates that the new configuration parameters are corrupted, the value of the guard bit $GB_1$ is set to prevent using the new configuration parameters. If the error-correcting code indicates that the new configuration parameters are not corrupted, the value of the guard bit $GB_1$ is set to allow using the new configuration parameters.

The selection circuit $SELC_1$ also comprises a multiplexer $MUX_1$. The multiplexer $MUX_1$ comprises two inputs configured to receive the default configuration parameters DCFP and the new configuration parameters NCFP and one output configured to deliver the selected configuration parameters SCFP.

The multiplexer $MUX_1$ also comprises a selector pin to select the configuration parameters between the default configuration parameters DCFP and the new configuration parameters NCFP. The selector pin is configured to receive a selection signal $SEL_1$.

In particular, the selection circuit $SELC_1$ comprises an AND logic gate $ANDG_1$ used to generate the selection signal $SEL_1$. The logic gate $ANDG_1$ is further configured to receive the guard bit GB, a reset signal $RST_1$ and a disabling signal $DSB_1$. Thus, the selection signal $SELC_1$ is configured to select the new configuration parameters NCFP only when the guard bit $GB_1$ indicates that the new configuration parameters NCFP are valid. The selection circuit $SELC_1$ can be coded at a register-transfer level.

As shown in FIG. 5, another selection circuit $SELC_2$ can also be used to gate signals SGT. The selection circuit $SELC_2$ is configured to gate the signals SGT according to a gating bit SGB.

More particularly, the selection circuit $SELC_2$ includes relevant parameter registers $RPR_2$ storing a default gating bit DGB coded at a register-transfer level. The relevant parameter registers $RPR_2$ also includes a volatile register $CFVR_2$ connected to the configuration bus CFB. This volatile register $CFVR_2$ is configured to store a new gating bit NGB received from the configuration bus CFB and can also be configured to store a guard bit $GB_2$. The guard bit $GB_2$ is configured to validate the possibility of using the new gating bit NGB.

The selection circuit $SELC_2$ further comprises an AND logic gate $ANDG_2$ used to generate a selection signal $SEL_2$. The logic gate $ANDG_2$ is configured to receive the guard bit $GB_2$, a reset signal $RST_2$ and a disabling signal $DSB_2$.

The selection circuit $SELC_2$ also comprises a multiplexer $MUX_2$. The multiplexer $MUX_2$ comprises two inputs configured to receive the default gating bit DGB and the new gating bit NGB and one output configured to deliver the selected gating bit SGB. The multiplexer $MUX_2$ also comprises a selector pin configured to receive the selection signal $SEL_2$. Thus, the selection signal $SEL_2$ is configured to select the new gating bit NGB only when the guard bit $GB_2$ indicates that the new gating bit NGB is valid.

The selection circuit $SELC_2$ also comprises an AND gate $ANDG_3$ having a first input connected to the output of the multiplexer $MUX_2$ to receive the selected gate bit SGB, and other inputs configured to receive the signals SGT to be gated. Therefore, the gate $ANDG_3$ can gate the signals SGT according to the value of the selected gate bit SGB. These gated signals SGT can therefore be transmitted to a subcircuit SBC to be gated.

Thus, such a selection circuit $SELC_2$ is configured to gate signals SGT in order to enable or disable some features or parameters of the bus matrix BM or the submatrix SM.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A system on chip comprising:
   at least one master device;
   at least one slave device;
   a connection interface connected to the at least one master device and the at least one slave device, the connection interface configured to:
      route signals between the at least one master device and the at least one slave device, and
      operate according to configuration parameters; and
   a configuration bus connected to the connection interface,
   wherein the configuration bus, the at least one master device and the at least one slave device are independently connected to the connection interface,
   wherein the configuration bus is configured to deliver new configuration parameters to the connection interface so as to adapt operation of the connection interface,
   wherein the connection interface comprises a selection circuit configured to select the configuration parameters between the new configuration parameters and default configuration parameters, and
   wherein the selection circuit is configured to select a new configuration parameter based on a value of a guard bit guarantying that the new configuration parameter is valid.

2. The system on chip according to claim 1, wherein the connection interface comprises:
   at least one input stage connected to the at least one master device;
   at least one output stage connected to the at least one slave device; and
   at least one decoder connected to the at least one input stage and to the at least one output stage.

3. The system on chip according to claim 2, wherein each of the at least one input stage, the at least one output stage and the at least one decoder are configured to operate according to the configuration parameters.

4. The system on chip according to claim 2, wherein the configuration bus is connected to each of the at least one input stage, the at least one output stage and the at least one decoder.

5. The system on chip according to claim 4, wherein the configuration bus is configured to deliver to each of the at least one input stage, the at least one output stage and the at least one decoder the new configuration parameters so as to define their operation.

6. The system on chip according to claim 2, wherein the at least one output stage includes an arbiter and an output logic circuit.

7. The system on chip according to claim 1, further comprising a memory connected to the configuration bus, wherein the memory is configured to store the new configuration parameters.

8. The system on chip according to claim 7, wherein the memory is a flash memory.

9. The system on chip according to claim 1, wherein the selection circuit comprises a register, and wherein the default configuration parameters are stored in the register and are coded at a register-transfer level.

10. The system on chip according to claim 1, wherein the selection circuit further comprises a volatile register configured to store the new configuration parameters, and wherein the volatile register is further configured to store the guard bit.

11. The system on chip according to claim 1, wherein the selection circuit comprises a register, a MUX and an AND gate, wherein a first input of the MUX is connected to a non-volatile register of the register and a second input of the MUX is connected to a volatile register of the register, and wherein the MUX is controllable by an output of the AND gate.

12. The system on chip according to claim 11, wherein the AND gate is configured to:
   receive a reset signal, a disabling signal and a guard bit signal; and
   select the new configuration parameter only when the guard bit signal indicates that the new configuration parameter is valid, the guard bit storable in the volatile register.

13. The system on chip according to claim 11, wherein the register is configured to store a default gating bit in the non-volatile register and a new gating bit in the volatile register.

14. The system on chip according to claim 11, wherein an output of the MUX is connected to a first input of a second AND gate, and wherein a second input of the second AND gate is connected to a terminal configured to provide a signal to be gated.

15. The system on chip according to claim 14, wherein the second AND gate is configured to provide a gate signal according to a selected gate bit.

16. The system on chip according to claim 1, wherein the connection interface comprises:
   at least one input stage connected to the at least one master device;
   at least one output stage connected to the at least one slave device; and
   at least one decoder connected to the at least one input stage and to the at least one output stage,
   wherein each of the at least one input stage, the at least one output stage and the at least one decoder comprises a selection circuit configured to select the configuration parameters between the new configuration parameters and the default configuration parameters.

17. A system on chip comprising:
   at least one master device;
   at least one slave device;
   a connection interface configured to route signals between the at least one master device and the at least one slave device, the connection interface configured to operate according to configuration parameters; and
   a configuration bus connected to the connection interface,
   wherein the configuration bus comprises a selection circuit having a volatile register configured to:
      store new and default configuration parameters, and
      store a guard bit,
   wherein the selection circuit is configured to select a new configuration parameter according to a value of the guard bit guarantying that the new configuration parameter is valid, and
   wherein the configuration bus is configured to deliver the new configuration parameter to the connection interface so as to adapt operation of the connection interface.

18. A system on chip comprising:
   at least one master device;
   at least one slave device;
   a connection interface configured to route signals between the at least one master device and the at least one slave device, the connection interface configured to operate according to configuration parameters; and a configuration bus connected to the connection interface, wherein the configuration bus comprises a selection circuit configured to select configuration parameters between new configuration parameters and default configuration parameters, wherein the selection circuit comprises a register, a MUX and an AND gate, wherein a first input of the MUX is connected to a non-volatile register of the register and a second input of the MUX is connected to a volatile register of the register, wherein the MUX is controllable by an output of the AND gate, and wherein the configuration bus is configured to deliver the new configuration parameters to the connection interface so as to adapt operation of the connection interface.

19. The system on chip according to claim 18, wherein the AND gate is configured to:

receive a reset signal, a disabling signal and a guard bit signal; and select the new configuration parameter only when the guard bit signal indicates that the new configuration parameter is valid, the guard bit storable in the volatile register.

20. The system on chip according to claim 18, wherein an output of the MUX is connected to a first input of a second AND gate, and wherein a second input of the second AND gate is connected to a terminal configured to provide a signal to be gated.

* * * * *